US 7,425,073 B2

(12) United States Patent
Wood et al.

(10) Patent No.: US 7,425,073 B2
(45) Date of Patent: Sep. 16, 2008

(54) METHOD AND APPARATUS FOR CONSERVING POWER IN A LASER PROJECTION DISPLAY

(75) Inventors: Frederick F. Wood, Medford, NY (US); Paul Dvorkis, E. Setauket, NY (US); Ron Goldman, Cold Spring Harbor, NY (US); Narayan Nambudiri, Kings Park, NY (US); Miklos Stern, Woodmere, NY (US); Chinh Tan, Setauket, NY (US); Carl Wittenberg, Water Mill, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 379 days.

(21) Appl. No.: 10/858,511

(22) Filed: May 31, 2004

(65) Prior Publication Data
US 2005/0141069 A1   Jun. 30, 2005

Related U.S. Application Data

(60) Provisional application No. 60/533,928, filed on Dec. 31, 2003.

(51) Int. Cl.
*G03B 21/28* (2006.01)
(52) U.S. Cl. .................... 353/28; 353/85; 353/122; 348/800; 359/196
(58) Field of Classification Search ............. 353/29, 353/28, 69, 70, 42, 46, 50, 51, 94, 98, 99, 353/122, 85; 348/745, 746, 771, 800; 349/5, 349/7–10; 359/196
See application file for complete search history.

(56) References Cited

U.S. PATENT DOCUMENTS

| 5,450,147 | A | * | 9/1995 | Dorsey-Palmateer | ......... 353/28 |
| 5,541,680 | A | * | 7/1996 | Fromm | ....................... 353/122 |
| 6,547,397 | B1 | * | 4/2003 | Kaufman et al. | .............. 353/28 |
| 6,634,757 | B2 | * | 10/2003 | Asakawa | ..................... 353/85 |
| 6,945,652 | B2 | * | 9/2005 | Sakata et al. | .................. 353/30 |
| 6,979,086 | B2 | * | 12/2005 | Hu | .............................. 353/57 |
| 7,030,353 | B2 | * | 4/2006 | Stern et al. | ................. 250/205 |
| 7,066,606 | B2 | * | 6/2006 | Greve et al. | ................... 353/85 |
| 7,090,356 | B2 | * | 8/2006 | Koide | .......................... 353/85 |
| 2002/0125324 | A1 | | 9/2002 | Yavid et al. | |
| 2003/0010888 | A1 | | 1/2003 | Shimada et al. | |
| 2004/0160581 | A1 | * | 8/2004 | Parker et al. | ................. 353/122 |
| 2005/0140832 | A1 | * | 6/2005 | Goldman et al. | ............ 348/746 |
| 2005/0141573 | A1 | * | 6/2005 | Yavid et al. | .................... 372/26 |

FOREIGN PATENT DOCUMENTS

JP    2003-270612    9/2003

OTHER PUBLICATIONS

International Search Report PCT/US2004/043187 dated Mar. 23, 2005.

* cited by examiner

*Primary Examiner*—Andrew T Sever
(74) *Attorney, Agent, or Firm*—Kirschstein, et al.

(57) ABSTRACT

A method and apparatus are provided to controllably reduce power of a laser projection display (LPD). Light is scanned from a laser onto a viewing surface to produce an image thereon, and power used by the laser is reduced used while scanning at least a portion of the viewing surface.

8 Claims, 7 Drawing Sheets

METHOD AND APPARATUS FOR CONSERVING POWER IN A LASER PROJECTION DISPLAY

This is a continuation of a provisional application U.S. Ser. No. 60/533,928 filed Dec. 31, 2003.

BACKGROUND OF THE INVENTION

1. Field of the Invention

This invention relates generally to electronic displays, and, more particularly, to a method and apparatus for conserving power in a laser projection display.

2. Description of the Related Art

Small, portable electronic devices, such as cell phones, PDAs, portable DVD players, laptop computers, and the like are becoming increasingly popular. These devices, however, suffer from an abbreviated operating period. That is, these portable devices typically receive power from a battery, which must be periodically replaced or recharged, as needed. In many of these portable electronic devices, the period of time between charges is too short, limiting their usefulness.

The present invention is directed to overcoming, or at least reducing, the effects of one or more of the problems set forth above.

SUMMARY OF THE INVENTION

In one aspect of the instant invention, a method is provided for controlling a laser. The method comprises scanning light from a laser onto a viewing surface to produce an image thereon; and reducing power used by the laser while scanning at least a portion of the viewing surface.

In another aspect of the instant invention, a method is provided for controlling a laser projection device. The method comprises scanning light from a plurality of lasers onto a viewing surface to produce an image thereon, wherein each laser produces light of a different color. Power used by at least one of the plurality of lasers is reduced while scanning at least a portion of the viewing surface.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
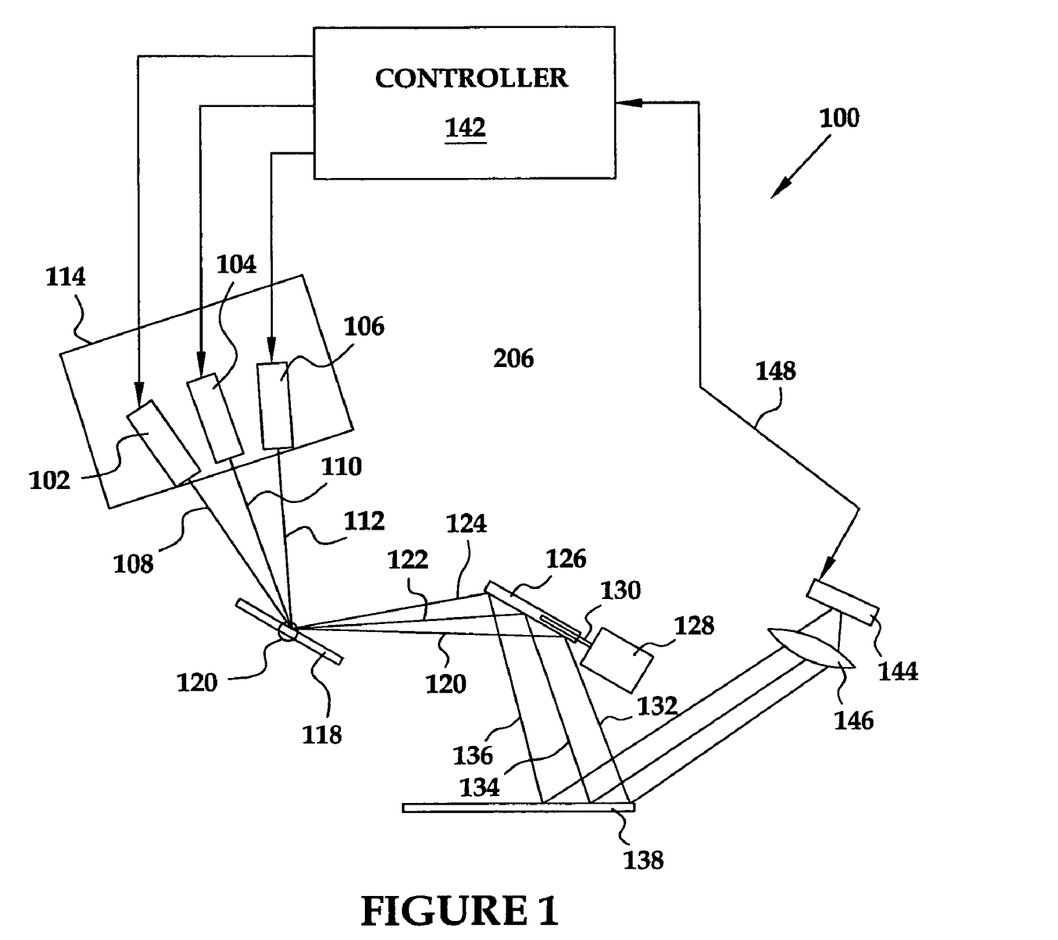
FIG. 1 is a stylistic block diagram of a top level view of one embodiment of the present invention.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120A at a relatively high rate (e.g., about 20-30 KHz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
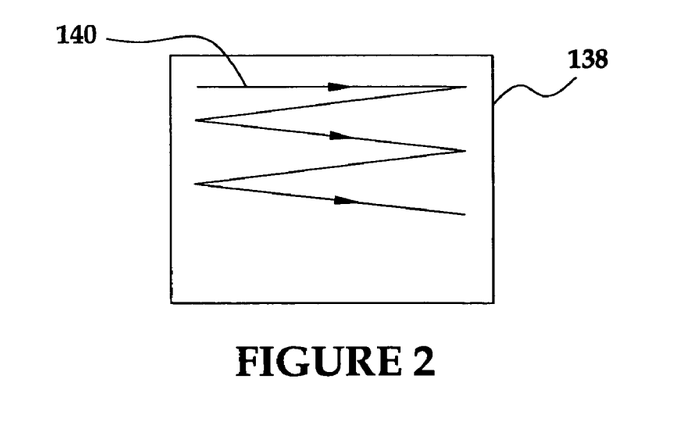
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
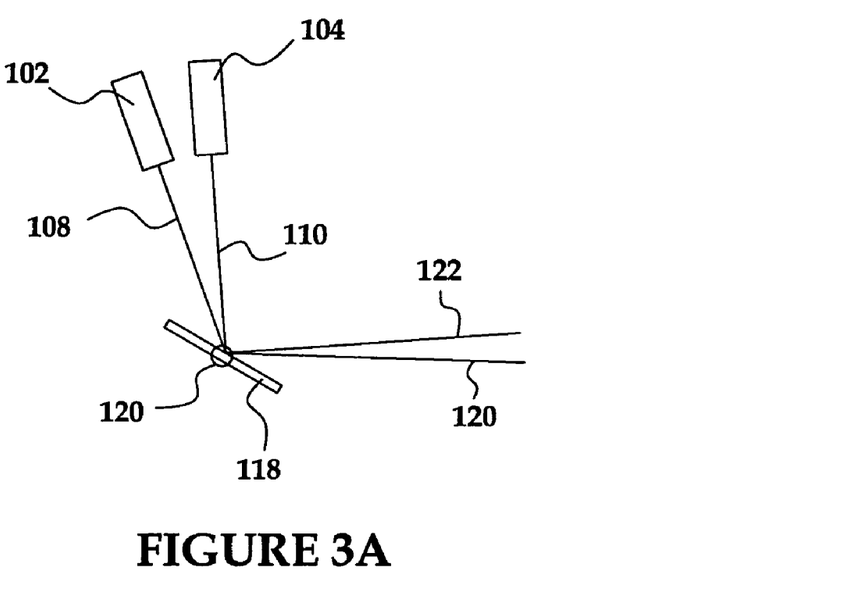
FIGS. 3A and 3B depict a top view of a scanning device at various times during its operation.
Figure 3B:
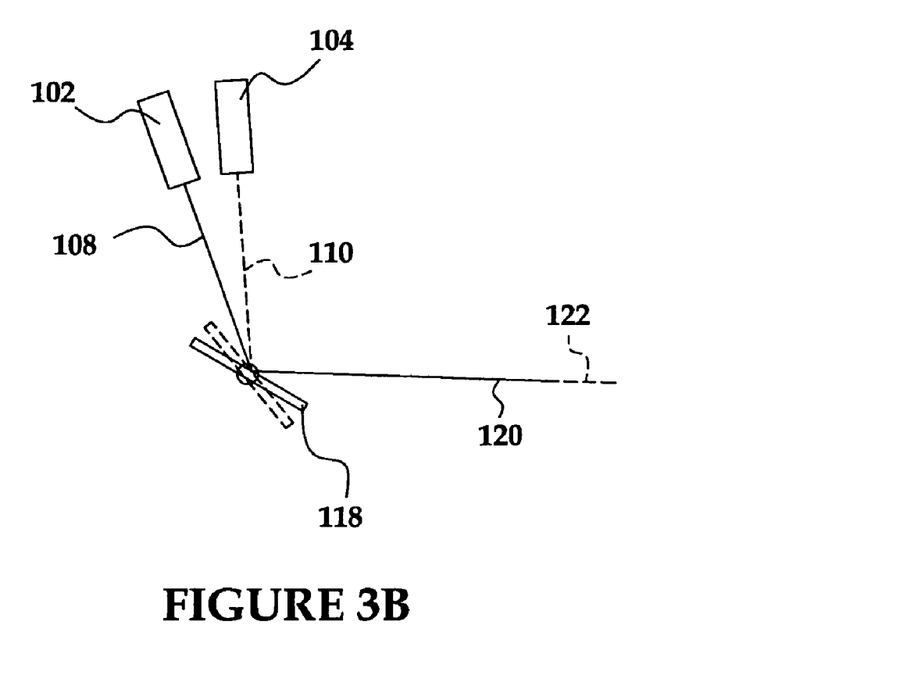

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensitive elements, it may be useful to also convey information regarding the location of the reflected laser light. As discussed in more detail in conjunction with FIG. 4, the controller 142 may use the information regarding the magnitude of the reflected laser light to generally determine if conditions within the transmission path of the lasers have changed, such as by being interrupted by a person or object, or the viewing surface being altered. If such an event is detected, the operation of the lasers may be modified by, for example, substantially reducing the power delivered therefrom or by shutting them off.

When the LPD 100 is used as a computer display battery power can be conserved by the following methods:
1) Non-active windows or areas of the display can be dimmed or darkened completely;
2) As a function of elapsed time or lack of user activity, the display can be automatically dimmed or darkened completely;
3) When there is text or line drawing types of content or a text based application displayed, the LPD can automatically reverse the video in these areas. For example, black lines or text would be displayed as white or bright lines on a black background; and
4) One or two lasers (for example the red and blue colors) can be dimmed or turned off completely.

When the display is used as any type of display, battery power can be conserved by a variety of methods. First, a light detector in the LPD can be used to sense the ambient lighting conditions, and can reduce the laser brightness when the ambient lighting conditions are low.

Additionally, the reflectivity of the projection screen and distance to the screen (or other projection surface) can be sensed, and the laser brightness can be adjusted to save energy. The color or tint of the projection surface can also be sensed, so that the color mix of the 3 lasers can be automatically adjusted to correct color balance. This light detector can be added, or an existing photo diode in the LPD can be used by momentarily turning off the lasers to measure only the ambient lighting conditions.

Power may also be conserved by designing the laser characteristics so that the optimum laser efficiency is obtained at a temperature higher than ambient (room temperature). This will save energy by minimizing or eliminating the need for a thermoelectric cooler. The temperature can be controlled by use of a heating element.

The laser modulation for setting the brightness of any displayed pixel can be achieved by pulse width modulation. This will save power by turning each laser current completely off and on so that the laser consumes no power when the pixel is dark. If pulse width modulation is not used, then the laser current will be modulated to a low level when the pixel is dark. In this case, the laser current can still be turned completely off when it is known that there will be a long dark row of pixels in the display, and turned back on before the next bright pixel.

Reducing the scan angle of the horizontal and or vertical scan mirrors will result in a brighter display. Alternatively, the laser power can be reduced and the brightness maintained by reducing the scan angle of the horizontal and or vertical scan mirrors. Power is saved by the reduced laser current (or reduced PWM duty cycle) and the decreased mirror angles needing less current.

The LPD can detect the presence or absence of an external power source, and therefore, the LPD will reduce laser brightness when running on battery power alone. The LPD can also use slightly less battery power if some external power source, like the USB port of a computer is detected.

Frame Rate

The frame rate or refresh rate of the raster scanning can be synchronized to the frame rate of the video information source, or not. For example, standard VGA video is output at 60 frames per second. Alternatively, the frame rate can be optimized for highest resolution. For example, a 50 Hz frame rate will display more horizontal scan lines than a 60 Hz frame rate. Preferably, the frame rate is set low for highest resolution, but not so low that it appears to be flashing.

Convergence

Figure 4A:
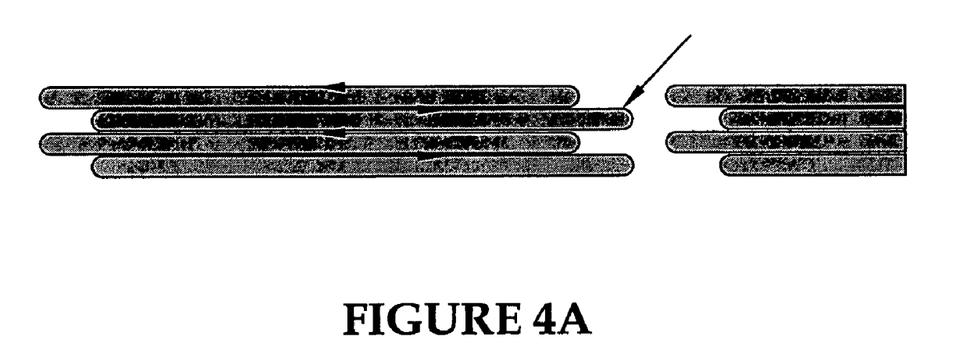
FIGS. 4A and 4B respectively depict non-converged and converged line scans of an LPD.
Figure 4B:
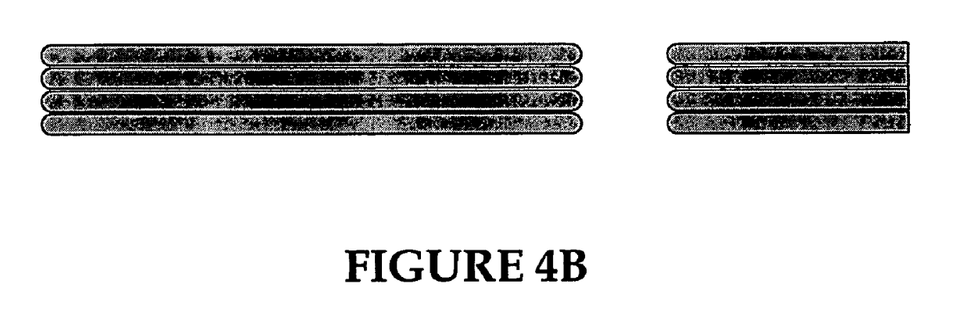

The horizontal scanning on LPD is bi-directional. This means that the left going and right going scans must be synchronized or lined up. An example of mis-converged left going and right going scans is depicted in FIG. 4A, whereas properly converged left going and right going scans is depicted in FIG. 4B.

Figure 5A:
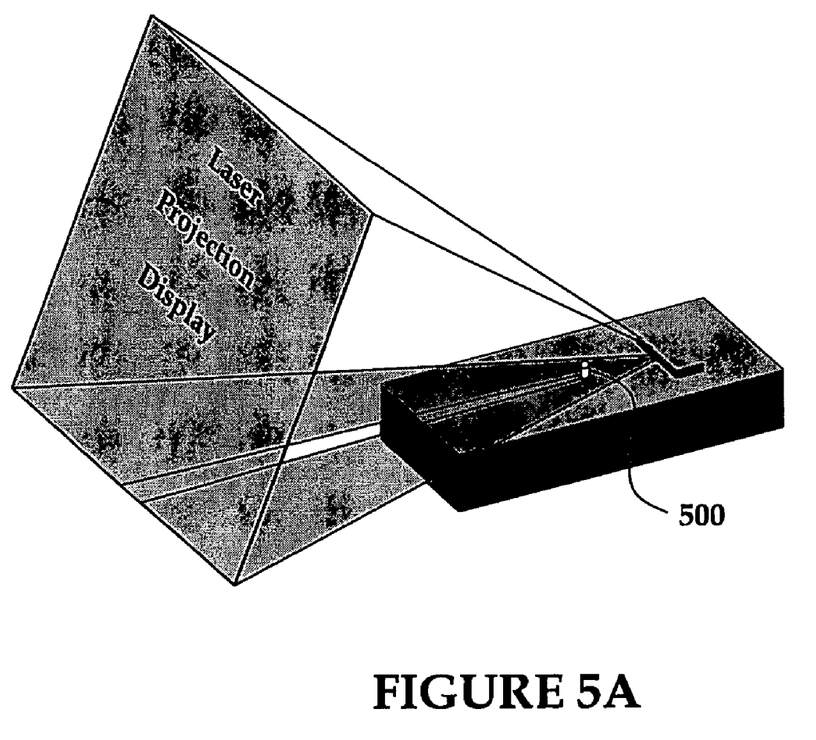
FIGS. 5A and 5B depict one embodiment of an LPD with an alignment pin.
Figure 5B:
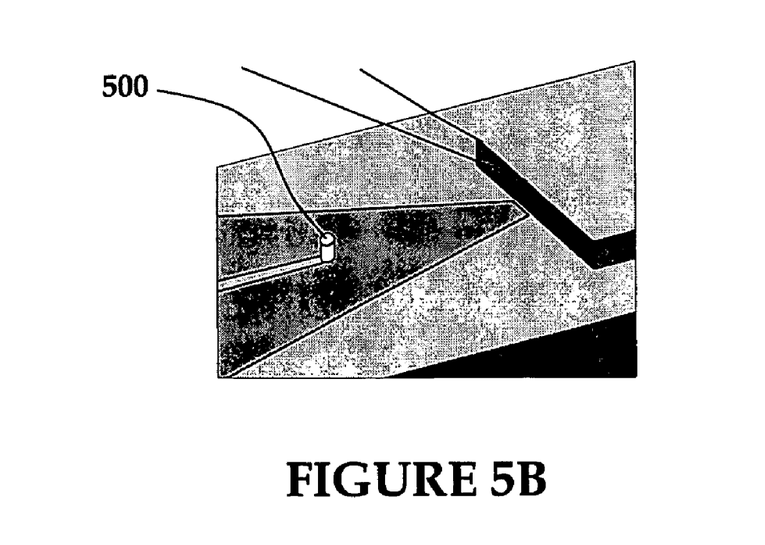

This can be achieved by utilizing a method of position sensing on the horizontal scan mirror, that provides a position reference for the left going and right going scans. Alternatively, the horizontal mirror position reference can be accomplished by utilizing a calibration pin or mark 500, as shown in FIGS. 5A and 5B. The outgoing scan beam can strike a small reflective object, preferably at the bottom of the frame.

Typically, in the LPD, the bottom 1 or 2 scan lines are used for laser power measurement. This means that the laser is left on (not modulated) during these scan lines, so that the laser monitor photodiode can be read to control the laser power. FIGS. 5A and 5B show the bottom scan lines hitting the calibration pin 500 mounted near the LPD aperture. A photodiode would be used to receive the laser reflection from this calibration pin or mark during the left going and right going scans. Alternatively, if the laser was turned on for one pixel time period, at the point in time when the laser beam strikes this mark, then the reflection from the mark would be equally bright during the left going and right going scans, only when correct convergence has been achieved. The above method would allow the use of a lower speed photo diode amplifier. By turning on the different color lasers one at a time, the calibration pin can be used to sense any horizontal misalignment of the different color laser beams.

The pin can also be used to sense vertical scan mirror position, providing a reference for the end-of-frame. In this mode, the pin can also be used to sense vertical misalignment of the different color laser beams also by turning on the lasers one at a time.

The calibration pin 500 can be placed inside the scan module, or it can be placed outside the scan module on some external surface of the product. The calibration pin 500 may or may not have focusing optics associated with it, and may include a bounce mirror (with or without optical power) to provide a longer optical arm for increased accuracy.

The photodiode can also be used for capturing an image in laser camera mode. The image capture can be used for detecting a finger or stylus, and therefore create a touch screen in rear projection or front projection mode.

The calibration pin can be placed inside of an angled surface. This surface would be used to block the laser light that would otherwise be projected at the bottom of the screen without affecting the quality of the projected image, since this light is not part of the image. This would also block the laser light that is used to calibrate the laser power, since this light is also not part of the image.

In the case where the laser does not have a built in photodiode, for example when a YAG laser is used, this calibration pin reflection can be used to measure the power of that laser.

Alternatively, the photo diode can be moved and placed in the same position where the calibration pin was.

DVD Player, or Personal Video Player

With conventional screens such as an LCD, the viewing screen can be no larger than the device itself. With the LPD, the viewing screen can be larger, by utilizing a roll up or collapsible screen, or projecting onto a wall or other surface.

Hard drive based Personal Video Players can be smaller than a DVD. These players have even smaller built-in screens than DVD players. The LPD provides a means of displaying a large screen on these small devices.

The LPD can be used as a high-density 2D barcode reader. Information, including text and pictures can be encoded onto a printed barcode, using existing "PDF417" or another existing or future developed type of code. The LPD can then scan and read this information, and then project the information in human readable form.

Screens

Figure 6A:
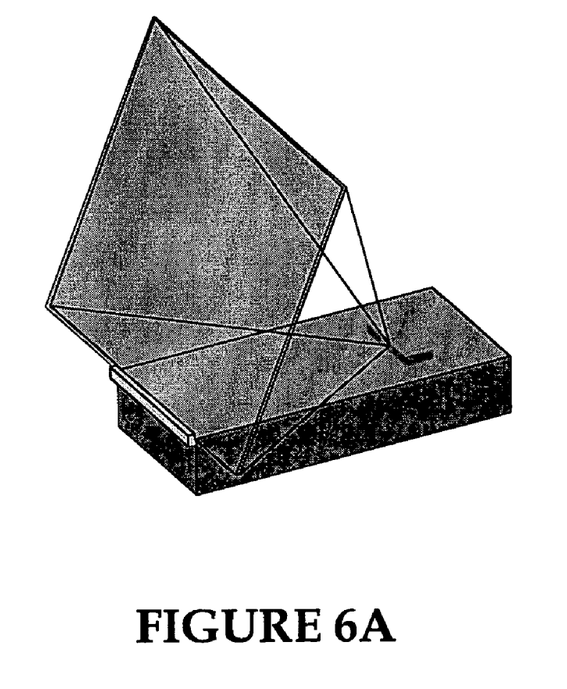
FIGS. 6A and 6B depict an LPD with varying sizes of screens.
Figure 6B:
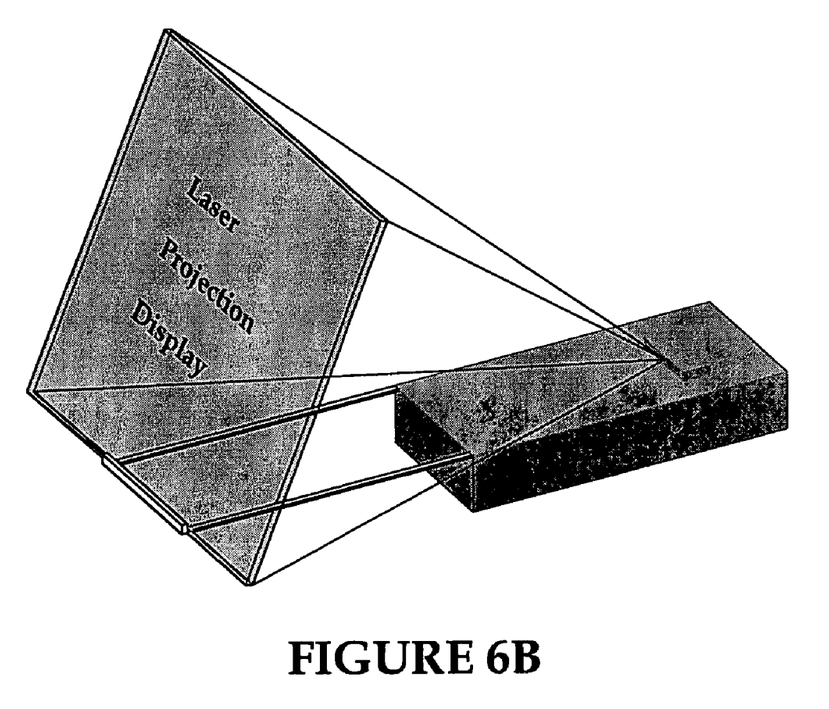

A device that uses an LPD can have interchangeable screens, which may, for example, be of varying size, as shown in FIGS. 6A and 6B. For example; small or large, wide screen or normal format. These projection screens can also be cheap and disposable/replaceable, also the screen could be made sterile.

On toys, such as a portable gaming device, the plastic screen cover for the LCD can become scratched or otherwise damaged. An LPD with replaceable screen would allow a user to quickly and inexpensively replace the damaged screen.

Security

Figure 7A:
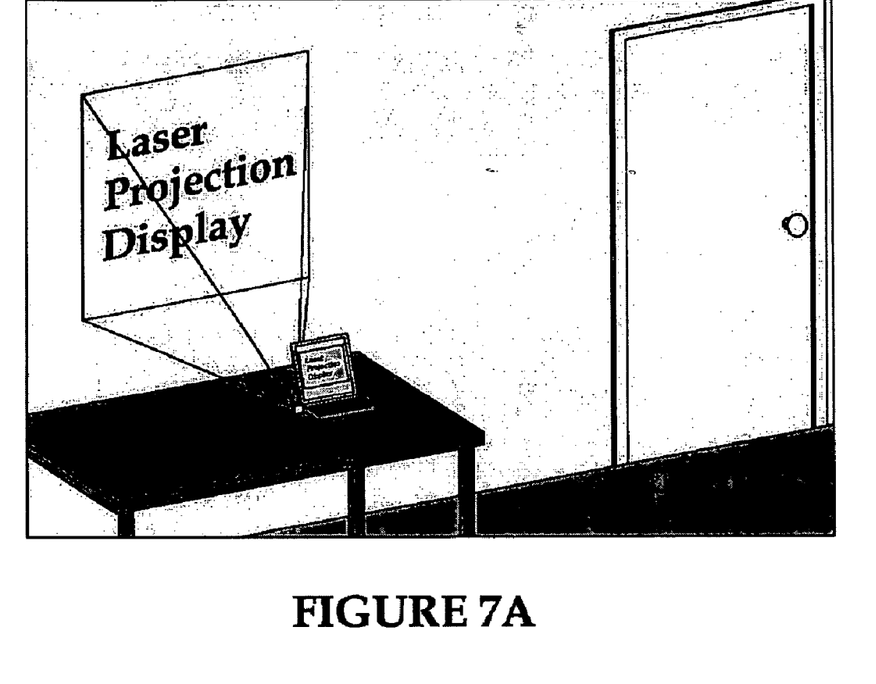
FIGS. 7A and 7B depict one embodiment of an LPD with a security device enabled.
Figure 7B:
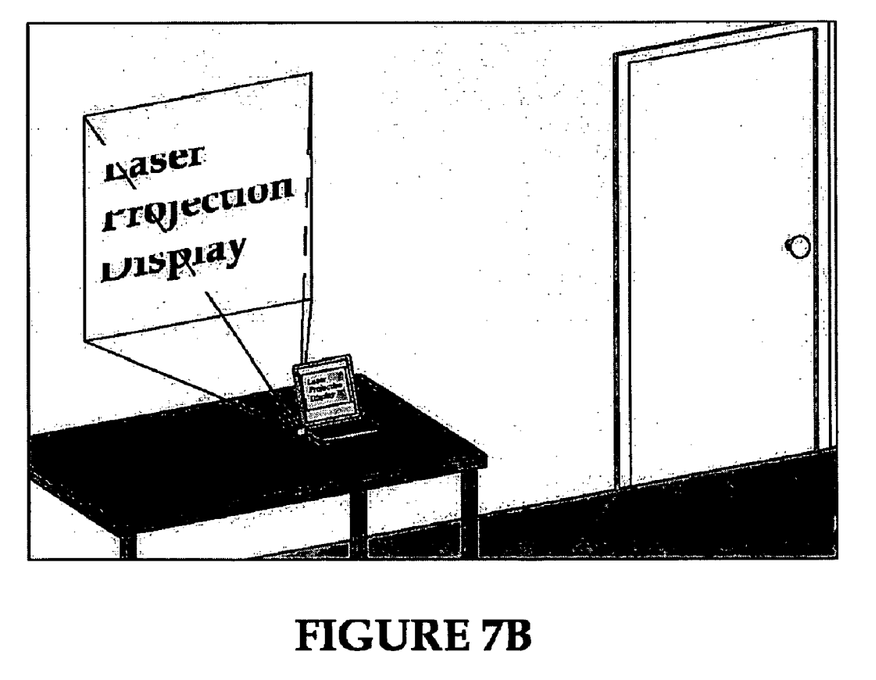

The LPD can have an additional infrared laser included. The infrared laser would be invisible to the human eye, but visible to a camera. This method could be used to obliterate the projected image, to prevent photographing. This would add security to sensitive information, or prevent movie piracy. An exemplary view of an LPD image as seen by an individual is shown in FIG. 7A, and the same image, as seen by a camera, is shown in FIG. 7B.

Alternatively, the LPD can have a variable scan rate. This would create a beating with the scan rate of video camera, and therefore partially destroy the images captured by the camera.

Ceiling Projector

The LPD can be used to project information and images on the ceiling.

A bedroom ceiling is ideal for this application, since it is typically the darkest room in the house, and the large image produced is best viewed in low ambient lighting conditions. The ceiling is also ideal for viewing while lying in bed.

Some potential projected content includes: Television, recorded movies, Clock, Weather, computer and the Internet. Interaction with projected information can include; voice command, keyboard and mouse, and a laser pointer.

Laser Pointer/Mouse

A specially designed laser pointer can be used to interact with the LPD image. This pointer can include a photodiode, which receives the projected laser light that is reflected from the wall or screen. If the pointer was wired or wirelessly connected to the LPD device, the timing of the light received by the photodiode in the pointer would indicate the position on the raster, since the raster is time based.

Figure 8:
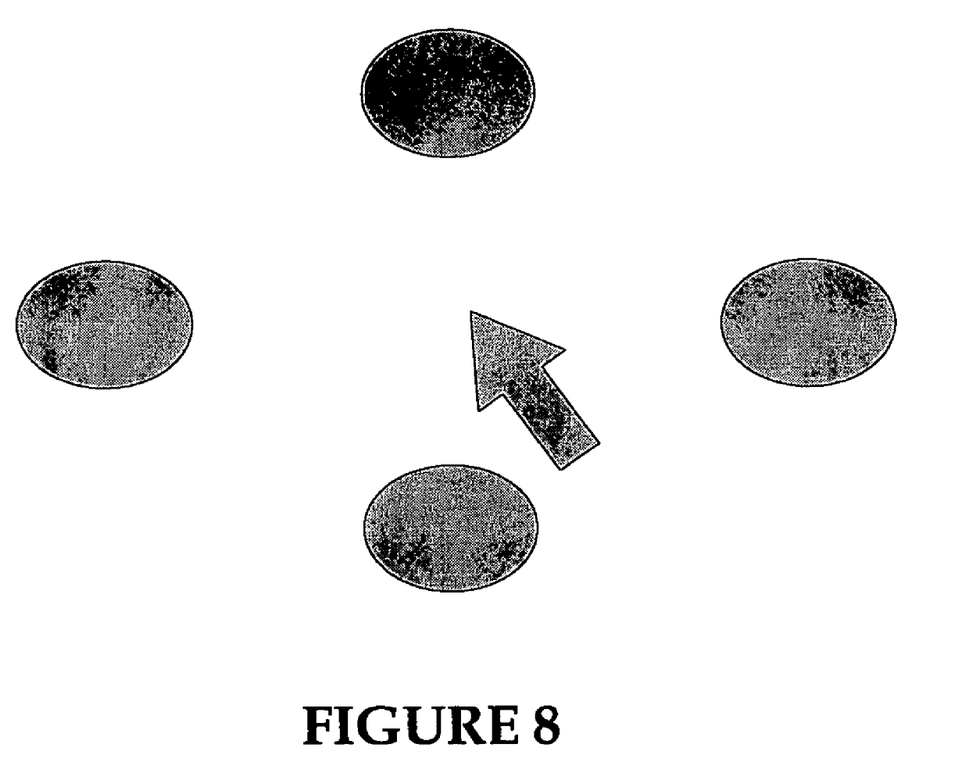
FIG. 8 depicts one embodiment of a mouse pointer image projected by an LPD.

The LPD may create a mouse pointer position by projecting, for example, 4 dots or lines in a diamond pattern in the center of the screen, as shown in FIG. 8. If the specially designed laser pointer were aimed at one of the dots in the diamond pattern, the photodiode in the pointer would receive the signal from that position dot. The photodiode would have a lens to provide a collimated field of view. Depending on the signal received, the LPD could compute which of the 4 dots the pointer was aimed at, and therefore move the diamond in that direction. Alternatively, if the specially designed laser pointer was not connected to the LPD, the pointer photo diode could still receive the timing information. If the laser spot from the pointer was modulated at a relatively slow rate (e.g., about 60 hz or less) in sync with the projected diamond dots or one of the dots (indicating direction) then a photodiode mounted in the LPD could receive the laser pointer signal and compute spot position. In either case, a click button or buttons on the pointer would provide mouse click function. Also special blinking of the laser pointer spot could also indicate a click to the LPD. This laser pointer method could be used to "draw" on the projected image, for highlighting or circling information on the screen. The laser pointer path would be added to the projected image by the LPD.

Alternatively, the pointer could have a motion sensor or tilt sensor that could control the mouse pointer.

A wired or wireless mouse/trackball could be used with the LPD.

Common Electronics

For multi-screen LPD applications, two or more laser projector modules could share some electronics. For example, a common front-end data receiver and image memory could split up the image information and send it to multiple projection modules. This would reduce cost of the device. For increased brightness or display size, two or more LPD's can create a "tiled" display. The tiled displays could have separate mirror assemblies, or two sets of lasers could share the same pair of mirrors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for conserving electrical power consumption during image projection, comprising:
    an energizable laser source for generating a laser beam when energized;
    a scanner for sweeping the laser beam along mutually orthogonal directions to project an image comprised of pixels on a projection surface away from the laser source;
    a detector for sensing an inactive area of the image on the projection surface for an interval of time, and for generating a control signal in response to elapse of the interval of time; and
    a controller for energizing the laser source by supplying electrical power to the laser source to generate the laser beam to illuminate selected individual pixels, and for deenergizing the laser source by interrupting the electrical power to the laser source to non-illuminate pixels other than the selected individual pixels upon generation of the control signal.

2. The arrangement of claim 1, wherein the laser source includes a plurality of lasers of different wavelengths, and wherein the controller is operative for interrupting the electrical power to at least one of the lasers.

3. An arrangement for conserving electrical power consumption during image projection, comprising:
    an energizable laser source for generating a laser beam when energized;
    a scanner for sweeping the laser beam along mutually orthogonal directions to project an image comprised of pixels on a projection surface away from the laser source;
    a detector for sensing one of text and lines in the image, and for generating a control signal in response to detection of the sensing of the one of text and lines; and
    a controller for energizing the laser source by supplying electrical power to the laser source to generate the laser beam to illuminate selected individual pixels, and for deenergizing the laser source by interrupting the electrical power to the laser source to non-illuminate pixels other than the selected individual pixels upon generation of the control signal.

4. The arrangement of claim 3, wherein the laser source includes a plurality of lasers of different wavelengths, and wherein the controller is operative for interrupting the electrical power to at least one of the lasers.

5. A method of conserving electrical power consumption during image projection, comprising the steps of:

generating a laser beam from an energizable laser source when energized;

sweeping the laser beam along mutually orthogonal directions to project an image comprised of pixels on a projection surface away from the laser source;

sensing an inactive area of the image on the projection surface for an interval of time, and generating a control signal in response to elapse of the interval of time; and energizing the laser source by supplying electrical power to the laser source to generate the laser beam to illuminate selected individual pixels, and deenergizing the laser source by interrupting the electrical power to the laser source to non-illuminate pixels other than the selected pixels upon generation of the control signal.

6. The method of claim 5, wherein the laser source includes a plurality of lasers of different wavelengths, and wherein the deenergizing step is performed by interrupting the electrical power to at least one of the lasers.

7. A method of conserving electrical power consumption during image projection, comprising the steps of:

generating a laser beam from an energizable laser source when energized;

sweeping the laser beam along mutually orthogonal directions to project an image comprised of pixels on a projection surface away from the laser source;

sensing one of text and lines in the image, and generating a control signal in response to sensing of the one of text and lines; and energizing the laser source by supplying electrical power to the laser source to generate the laser beam to illuminate selected individual pixels, and deenergizing the laser source by interrupting the electrical power to the laser source to non-illuminate pixels other than the selected pixels upon generation of the control signal.

8. The method of claim 7, wherein the laser source includes a plurality of lasers of different wavelengths, and wherein the deenergizing step is performed by interrupting the electrical power to at least one of the lasers.

* * * * *